United States Patent [19]

Tew

[11] Patent Number: 4,738,132

[45] Date of Patent: Apr. 19, 1988

[54] EFFICIENCY MONITORING DEVICE

[76] Inventor: Jerry J. Tew, 408 Mavrick Dr., Dothan, Ala. 36301

[21] Appl. No.: 891,453

[22] Filed: Jul. 30, 1986

[51] Int. Cl.$^4$ ............................................. G01L 3/26
[52] U.S. Cl. .......................................... 73/112; 112/1
[58] Field of Search ...................... 346/20, 26, 33 D; 73/112, DIG. 11; 324/175; 112/1

[56] References Cited

U.S. PATENT DOCUMENTS 1,339,381  5/1920  Avram ............................. 346/20 X
3,846,701  11/1974  Sampey ............................... 324/175

Primary Examiner—Jerry W. Myracle

Attorney, Agent, or Firm—Hurt, Richardson, Garner, Todd & Cadenhead

[57] ABSTRACT

An efficiency monitoring device determines the efficiency of a machine and operator where the machine is turned off and on by the operator. Efficiency is determined by first monitoring the cycle speed of a machine by means of a light source, a reflective tape, and a photoelectric cell which produces a signal from which a digital computer can continuously calculate the instantaneous cycle speed. The computer maintains a continuous time base, and then plots the cycle speed as a function of time to produce an efficiency profile for the machine and operator.

4 Claims, 12 Drawing Sheets

Match line to Fig 4A

| Time | Value |
|---|---|
| 08:34 | 650 |
| 08:35 | 672 |
| 08:36 | 539 |
| 08:37 | 759 |
| 08:38 | 530 |
| 08:39 | 141 |
| 08:40 | 337 |
| 08:41 | 711 |
| 08:42 | 520 |
| 08:43 | 274 |
| 08:44 | |
| 08:45 | |
| 08:46 | 544 |
| 08:47 | 731 |
| 08:48 | 572 |
| 08:49 | 794 |
| 08:50 | 529 |
| 08:51 | 778 |
| 08:52 | 605 |
| 08:53 | 731 |
| 08:54 | 771 |
| 08:55 | 535 |
| 08:56 | 1 |
| 08:57 | 729 |
| 08:58 | 322 |
| 08:59 | 638 |
| 09:00 | 665 |
| 09:01 | 752 |
| 09:02 | 497 |
| 09:03 | 449 |
| 09:04 | 577 |
| 09:05 | 556 |
| 09:06 | 777 |
| 09:07 | 537 |
| 09:08 | 242 |
| 09:09 | |
| 09:10 | |
| 09:11 | |
| 09:12 | |
| 09:13 | |
| 09:14 | |
| 09:15 | |
| 09:16 | |
| 09:17 | 540 |
| 09:18 | 274 |
| 09:19 | |
| 09:20 | |
| 09:21 | 496 |
| 09:22 | 494 |
| 09:23 | 489 |
| 09:24 | 735 |
| 09:25 | 633 |
| 09:26 | 596 |
| 09:27 | 500 |
| 09:28 | 730 |
| 09:29 | 510 |
| 09:30 | 267 |

Match line to Fig 4C

FIG 4B

```
           Match line to Fig 4B
09:31  ━━━━━━━━━━━*                              557
09:32  ━━━━━━━━━━━*                              544
09:33  ━━━━━━━━━━━━*                             613
09:34  ━━━━━━━━━━*                               515
09:35  ━━━━━━━━━━━━*                             637
09:36  ━━━━━━━━━━━━*                             609
09:37  ━━━━━━━━━━*                               502
09:38  ━━━━━━━━━━━━━*                            744
09:39  ━━━━━━━━━*                                492
09:40  ━━━━━━━━━━━━━*                            735
09:41  ━━━━━━━━━━━━━*                            756
09:42  ━━━━━━━━━━*                               532
09:43  ━━━━━━━━━━━━*                             702
09:44  ━━━━━━━━━━━━*                             731
09:45 *                                            
09:46  ━━━━━━━━━*                                510
09:47  ━━━━━━━━━*                                516
09:48  ━━━━━━━━━━━━*                             748
09:49  ━━━━━━━━━━━━*                             757
09:50  ━━━━━━━━━━*                               530
09:51  ━━━━━━━━━*                                498
09:52  ━━━━━*                                    303
09:53  ━━━━━━━━━━━━*                             705
09:54  ━━━━━━━━━━*                               635
09:55  ━━━━━━━━━━*                               618
09:56  ━━━━━━━━━*                                505
09:57  ━━━━━━━━━━━━━*                            747
09:58  ━━━━━━━━━━━━━*                            752
09:59  ━━━━━━━━━*                                492
10:00  ━━━━━━━━━━━━━*                            753
10:01  ━━*                                       255
10:02  ━━━━━━━━━*                                529
10:03  ━━━━━━━━━━━*                              645
10:04  ━━━━━━━━━━*                               627
10:05  ━━━━━━━━━━━━━*                            757
10:06  ━━━━━━━━*                                 495
10:07  ━━━━━━━━━━━━━*                            765
10:08  ━━━━━*                                    323
10:09  ━━━━━━━━━━*                               584
10:10  ━━━━━━━━━━*                               663
10:11  ━━━━━━━━━━*                               626
10:12 *                                            1
10:13 *                                            
10:14 *                                            
10:15 *                                            
10:16  ━━*                                       258
10:17  ━━━━━━━━*                                 490
10:18  ━━━━━━━━*                                 490
10:19  ━━━━━━━━━*                                519
10:20  ━━━━━━━━━━━━*                             742
10:21  ━━━━━━━━*                                 508
10:22  ━━━━━━━━━*                                515
10:23  ━━━━━━━━━━━━*                             748
10:24  ━━━━━━━━━*                                515
10:25  ━━━━━━━━━━*                               662
10:26  ━━*                                       160
10:27  ━━━━━━━*                                  497
           Match line to Fig 4D
```

| Time | Value |
|---|---|
| 10:28 | |
| 10:29 | 519 |
| 10:30 | 707 |
| 10:31 | 561 |
| 10:32 | 700 |
| 10:33 | 571 |
| 10:34 | 502 |
| 10:35 | 536 |
| 10:36 | 512 |
| 10:37 | 760 |
| 10:38 | 539 |
| 10:39 | 745 |
| 10:40 | 527 |
| 10:41 | 756 |
| 10:42 | 776 |
| 10:43 | 518 |
| 10:44 | |
| 10:45 | |
| 10:46 | 118 |
| 10:47 | 642 |
| 10:48 | 299 |
| 10:49 | 537 |
| 10:50 | 758 |
| 10:51 | 553 |
| 10:52 | 789 |
| 10:53 | 529 |
| 10:54 | 786 |
| 10:55 | 532 |
| 10:56 | 685 |
| 10:57 | 545 |
| 10:58 | 659 |
| 10:59 | 670 |
| 11:00 | 641 |
| 11:01 | 786 |
| 11:02 | 529 |
| 11:03 | 531 |
| 11:04 | 517 |
| 11:05 | 632 |
| 11:06 | 652 |
| 11:07 | 685 |
| 11:08 | 622 |
| 11:09 | |
| 11:10 | |
| 11:11 | 173 |
| 11:12 | 537 |
| 11:13 | 527 |
| 11:14 | 800 |
| 11:15 | 534 |
| 11:16 | 777 |
| 11:17 | 540 |
| 11:18 | 755 |
| 11:19 | 538 |
| 11:20 | 671 |
| 11:21 | 314 |
| 11:22 | |
| 11:23 | 15 |
| 11:24 | 526 |
| | 760 |

| Time | Bar | Value |
|---|---|---|
| 11:25 | | 543 |
| 11:26 | | 799 |
| 11:27 | | 527 |
| 11:28 | | 771 |
| 11:29 | | 530 |
| 11:30 | | 731 |
| 11:31 | | 582 |
| 11:32 | | 546 |
| 11:33 | | 769 |
| 11:34 | | 536 |
| 11:35 | | 77 |
| 11:36 | | 446 |
| 11:37 | | |
| 11:38 | | |
| 11:39 | | 503 |
| 11:40 | | 489 |
| 11:41 | | 745 |
| 11:42 | | 509 |
| 11:43 | | 752 |
| 11:44 | | 342 |
| 11:45 | | 196 |
| 11:46 | | |
| 11:47 | | |
| 11:48 | | |
| 11:49 | | |
| 11:50 | | |
| 11:51 | | |
| 11:52 | | |
| 11:53 | | |
| 11:54 | | |
| 11:55 | | |
| 11:56 | | |
| 11:57 | | |
| 11:58 | | |
| 11:59 | | |
| 12:00 | | |
| 12:01 | | |
| 12:02 | | |
| 12:03 | | |
| 12:04 | | |
| 12:05 | | |
| 12:06 | | |
| 12:07 | | |
| 12:08 | | |
| 12:09 | | |
| 12:10 | | |
| 12:11 | | |
| 12:12 | | |
| 12:13 | | |
| 12:14 | | |
| 12:15 | | |
| 12:16 | | 251 |
| 12:17 | | 574 |
| 12:18 | | 759 |
| 12:19 | | 683 |
| 12:20 | | 503 |
| 12:21 | | 555 |

FIG 4E

| Time | Value |
|---|---|
| 12:22 | 711 |
| 12:23 | 358 |
| 12:24 | 666 |
| 12:25 | 637 |
| 12:26 | 630 |
| 12:27 | 530 |
| 12:28 | 758 |
| 12:29 | 515 |
| 12:30 | 527 |
| 12:31 | 748 |
| 12:32 | 773 |
| 12:33 | 505 |
| 12:34 | 503 |
| 12:35 | 500 |
| 12:36 | |
| 12:37 | |
| 12:38 | |
| 12:39 | 535 |
| 12:40 | 549 |
| 12:41 | 535 |
| 12:42 | 646 |
| 12:43 | 331 |
| 12:44 | 781 |
| 12:45 | 528 |
| 12:46 | 781 |
| 12:47 | 529 |
| 12:48 | 543 |
| 12:49 | 687 |
| 12:50 | 639 |
| 12:51 | 529 |
| 12:52 | 674 |
| 12:53 | 640 |
| 12:54 | 670 |
| 12:55 | 656 |
| 12:56 | 532 |
| 12:57 | 544 |
| 12:58 | 552 |
| 12:59 | 759 |
| 13:00 | 542 |
| 13:01 | 799 |
| 13:02 | |
| 13:03 | |
| 13:04 | 250 |
| 13:05 | 539 |
| 13:06 | 514 |
| 13:07 | 787 |
| 13:08 | 533 |
| 13:09 | 651 |
| 13:10 | 159 |
| 13:11 | 528 |
| 13:12 | 702 |
| 13:13 | 594 |
| 13:14 | 683 |
| 13:15 | 508 |
| 13:16 | 384 |
| 13:17 | 783 |
| 13:18 | 532 |

FIG 4F

| Time | Value |
|---|---|
| 13:19 | 764 |
| 13:20 | 546 |
| 13:21 | 761 |
| 13:22 | 583 |
| 13:23 | 759 |
| 13:24 | 548 |
| 13:25 | 756 |
| 13:26 | 631 |
| 13:27 | 685 |
| 13:28 | 541 |
| 13:29 | 770 |
| 13:30 | 289 |
| 13:31 | |
| 13:32 | |
| 13:33 | 321 |
| 13:34 | 650 |
| 13:35 | 614 |
| 13:36 | 693 |
| 13:37 | 610 |
| 13:38 | 519 |
| 13:39 | 531 |
| 13:40 | 808 |
| 13:41 | 527 |
| 13:42 | 537 |
| 13:43 | 526 |
| 13:44 | 579 |
| 13:45 | 734 |
| 13:46 | 664 |
| 13:47 | 671 |
| 13:48 | 534 |
| 13:49 | 539 |
| 13:50 | 561 |
| 13:51 | 473 |
| 13:52 | 775 |
| 13:53 | 532 |
| 13:54 | 507 |
| 13:55 | 799 |
| 13:56 | 518 |
| 13:57 | 617 |
| 13:58 | 604 |
| 13:59 | 508 |
| 14:00 | 109 |
| 14:01 | |
| 14:02 | |
| 14:03 | |
| 14:04 | 358 |
| 14:05 | 207 |
| 14:06 | 427 |
| 14:07 | 190 |
| 14:08 | |
| 14:09 | |
| 14:10 | |
| 14:11 | |
| 14:12 | |
| 14:13 | |
| 14:14 | |
| 14:15 | |

FIG 4G

```
         Match line to Fig 4G
14:16  *
14:17  *
14:18  *
14:19  *
14:20  *
14:21  *
14:22  *
14:23       ━━━━━━━*                                  436
14:24       ━━━━━━━━━*                                566
14:25       ━━━━━━━━━━━*                              618
14:26       ━━━━━━━━━━*                               597
14:27       ━━━*                                      247
14:28       ━━━━━━━━━*                                577
14:29       ━━━━━━━━━*                                607
14:30       ━━━━━━━━━*                                609
14:31       ━━━━━━━━━*                                610
14:32       ━━━━━*                                    414
14:33       ━━━━━━━━━*                                622
14:34       ━━━━━━━━━━━━━*                            760
14:35       ━━━━━*                                    418
14:36       ━━━━━━━━━━━*                              695
14:37       ━━━━━━━━━━━*                              703
14:38       ━━━━━━━━━━━━*                             755
14:39       *                                          53
14:40  *
14:41  *
14:42       ━━━━━*                                    377
14:43       ━━━━━━━*                                  666
14:44       ━━━━━*                                    459
14:45       ━*                                        172
14:46       ━*                                        374
14:47       ━━━━━*                                    567
14:48       ━━━━*                                     517
14:49       ━━━━━*                                    616
14:50  *
14:51  *
14:52       ━━━━━*                                    424
14:53       ━━━━*                                     406
14:54       ━*                                        218
14:55       ━━━━━*                                    609
14:56       ━━━━*                                     509
14:57       ━━━━━━━*                                  725
```

FIG 4H

```
OPERATOR NAME  =  FANNIE SCOTT
EMPLOYEE #     =  0321
JOB NAME       =  DN JOIN SHOULDERS
PRODUCT        =  KN230    .4890
STUDY DATE     =  06-19-1986
                                          MACHINE SPEED = 5621
                    HUNDRED STICTCHES/MINUTE
               1 1 1 1 1 2 2 2 2 2 3 3 3 3 3 4 4 4 4 4 5 5 5 5 5 6
        0.2.4.6.8.0.2.4.6.8.0.2.4.6.8.0.2.4.6.8.0.2.4.6.8.0.2.4.6.8.0.

10:38:43 =*  1st shld                                                3
10:38:44 ===================*                                       50
10:38:45 =========================*                                 37
10:38:46*                                                            0
10:38:47*                                                            0
10:38:48*                                                            0
10:38:49*                                                            0
10:38:50*                                                            0
10:38:51*                                                            0
10:38:52*                                                            0
10:38:53*                                                            0
10:38:54 =*  2nd shld                                                4
10:38:55 =======================*                                   42
10:38:56 ===========================*                               48
10:38:57*                                                            0
10:38:58*                                                            0
10:38:59*                                                            0
10:39:00*                                                            0
10:39:01*                                                            0
10:39:02*                                                            0
10:39:03*                                                            0
10:39:04*                                                            0
10:39:05*                                                            0
10:39:06*                                                            0
10:39:07*                                                            0
10:39:08*                                                            0
10:39:09*                                                            0
10:39:10*                                                            0
10:39:11*                                                            0
10:39:12*                                                            0
10:39:13*                                                            0
10:39:14*                                                            0
10:39:15*                                                            0
10:39:16*                                                            0
10:39:17 =*  1st shld                                                3
10:39:18 ==========================*                                49
10:39:19 =======================*                                   42
10:39:20*                                                            0
10:39:21*                                                            0
10:39:22*                                                            0
10:39:23*                                                            0
10:39:24*                                                            0
10:39:25 =*  2nd shld                                                3
10:39:26 =============================================*             84
             Match line to Fig 5B
```

FIG 5A

```
              Match line to Fig 5A
10:39:27*     |         |          |          |         |          | 0
10:39:28*     |         |          |          |         |          | 0
10:39:29*     |         |          |          |         |          | 0
10:39:30*     |         |          |          |         |          | 0
10:39:31*     |         |          |          |         |          | 0
10:39:32*     |         |          |          |         |          | 0
10:39:33*     |         |          |          |         |          | 0
10:39:34 =*   1st shld  |          |          |         |          | 4
10:39:35 ================================*     |         |          | 51
10:39:36 =========================*            |         |          | 39
10:39:37*     |         |          |          |         |          | 0
10:39:38*     |         |          |          |         |          | 0
10:39:39*     |         |          |          |         |          | 0
10:39:40*     |         |          |          |         |          | 0
10:39:41 =*   2nd shld  |          |          |         |          | 6
10:39:42 ==============================================*            | 82
10:39:43*     |         |          |          |         |          | 0
END PRINT TIME  07:58:06
```

FIG 5B

EFFICIENCY MONITORING DEVICE

BACKGROUND OF THE INVENTION

This invention relates generally to efficiency monitoring devices for machine operators, and more particularly concerns an efficiency monitoring device for a sewing machine operator which produces a work versus time profile for the machine operator and machine being monitored.

In the garment industry, it is common to have garment manufacturing facilities in which a large number of workers produces garments using standard commercial sewing machines. In order to control costs, it is also common to reimburse such workers on a per-piece basis. In that manner, a manufacturer can predict the per-piece cost associated with each garment being manufactured in a predictable fashion. Such remuneration system also rewards the efficient worker who is able to produce a large number of piece goods in a short period of time.

Even though workers in such facilities are generally paid on a per-piece basis, their pay on a per-piece basis must rise to the level of the minimum hourly wage required by federal law. Consequently, if an inefficient operator does not sew enough piece goods together in order to meet the minimum wage requirements, the manufacturer will have to supplement that worker's pay, thereby increasing the per-piece cost of the goods produced. In the past, such inefficient workers were simply terminated. Such a practice, not only created hardship for the worker, but also increased the manufacturer's costs because of the additional costs involved in recruiting and training new workers.

In addition, even workers who were able to achieve the minimum wage standard on a per-piece basis sometimes, even though they appear willing and able to generate higher income, were not able to do so for reasons unknown to them or perhaps even to their supervisors.

In order to overcome the difficulties involved with inefficient workers including the additional cost to the manufacturer and to assist workers in increasing their productivity both to the benefit of the manufacturer and to themselves, it is necessary to be able to know on a time basis what it is that an operator is doing. Particularly, once the garment is properly positioned for stitching, it is important that the machine operator accelerate the sewing machine to the highest possible speed to complete the stitching operation before stopping and repositioning of the garment is undertaken. While some workers may appear to be very swift in their ability to reposition and prepare a garment for stitching during each operation, they may lose efficiency because they simply do not accelerate the sewing machine to the highest possible speed for the particular operation. In the past, such problems have been detected by supervisors who simply listened to the hum of the machine to determine which operators are working at highest efficiency and which are not. Such a practice, by its very description, suggests problems. Therefore, it is important to be able to analytically evaluate and graphically display a worker's efficiency in operating a sewing machine.

SUMMARY OF THE INVENTION

It is therefore an object of the present invention to provide an efficiency monitoring device for monitoring the work output of a sewing machine operator over both a full working shift and also over shorter time periods relating to the completion of specific assigned tasks.

The foregoing object is accomplished by monitoring the speed of the operator's sewing machine, expressed as stitches per unit time, over a time base which can be either expanded or contracted for ease of analysis for the time of interest. In order to monitor the speed of a sewing machine, it is necessary to count the revolutions of the sewing machine without the necessity of attaching complicated mechanical or electromechanical transmissions to the handwheel and thereby obstructing the operator's ability to use the handwheel. It is also important that the monitoring device be essentially portable so that it can be moved from machine to machine in order to allow the greatest flexibility in monitoring the overall operations within a particular facility.

Consequently, the present invention provides for monitoring the revolutions of the handwheel of a sewing machine by means of an infra-red detector switch in combination with a piece of reflective tape simply attached to the handwheel. A small piece of tape on the handwheel does not affect the operator's ability to operate the machine, and the infra-red sensing switch can be located adjacent the wheel in a position which will also avoid any problems associated with obstructing the operation of the handwheel.

The output of the infra-red sensing switch is connected to a logic circuit which in turn produces an ASCII character for each revolution of the handwheel. The ASCII character is then connected to a small portable computer which counts the number of stitches per unit time for each incremental time unit of interest and then displays the results in a profile showing the speed of the machine as a function of the time interval of interest. The resulting profile may have its time interval of interest either expanded or contracted in order to show a full day's shift or a more specific time interval relating to the carrying out of a specific sewing operation. The profile allows a supervisor to simply scan the chart in order to make rapid and immediate comparisons between an efficient worker and an inefficient worker and to discover quickly certain problems that may cause an inefficient worker to be less efficient than a more efficient worker.

Other objects and advantages of the invention will become apparent upon reading the following detailed description and upon reference to the drawings.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 2:
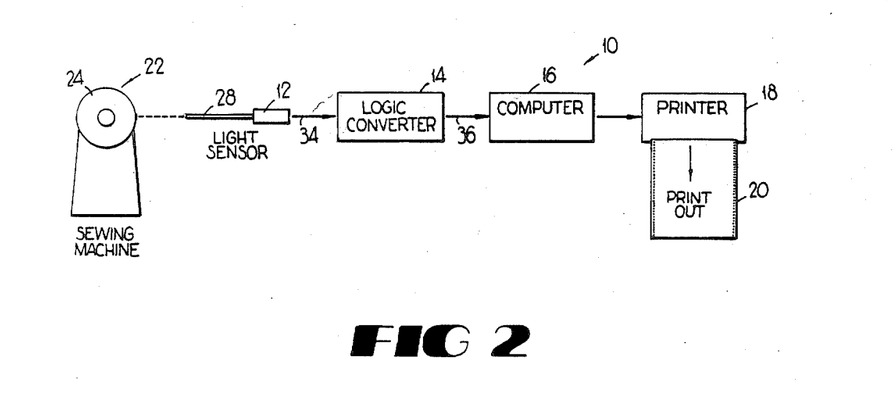
FIG. 2 is a block diagram for the efficiency monitoring device of the present invention.

Turning first to FIG. 2, there is shown a block diagram of the efficiency monitoring device 10 of the present invention for monitoring the efficiency of an operator of sewing machine 22. The monitoring device includes a light sensor 12, a logic converter 14, and a multi-purpose digital computer 16 which is connected to a standard printer 18 to produce a print-out 20.

In order to judge the efficiency of the operator of sewing machine 22, it is necessary to monitor the instantaneous speed in stitches per minute of the sewing machine 22 and display that speed as a function of time. In order to determine the instantaneous speed of the sewing machine 22 it is necessary to count the revolutions of the handwheel 24. Each revolution of the handwheel 24 produces a single stitch.

In order to detect the number of revolutions of the handwheel 24, a piece of reflective tape 26 (FIG. 1) is attached to an exposed surface of the handwheel 24 of the sewing machine 22. The light sensor 12 has a probe 28 which is aimed at the handwheel and directs a red or infra-red light source toward the handwheel. Each time the reflective tape 26 passes the light source from the light sensor 12, the light is reflected back and a photoelectric cell in the light sensor 12 senses the reflected light from the tape and produces a signal on line 34.

Figure 1:
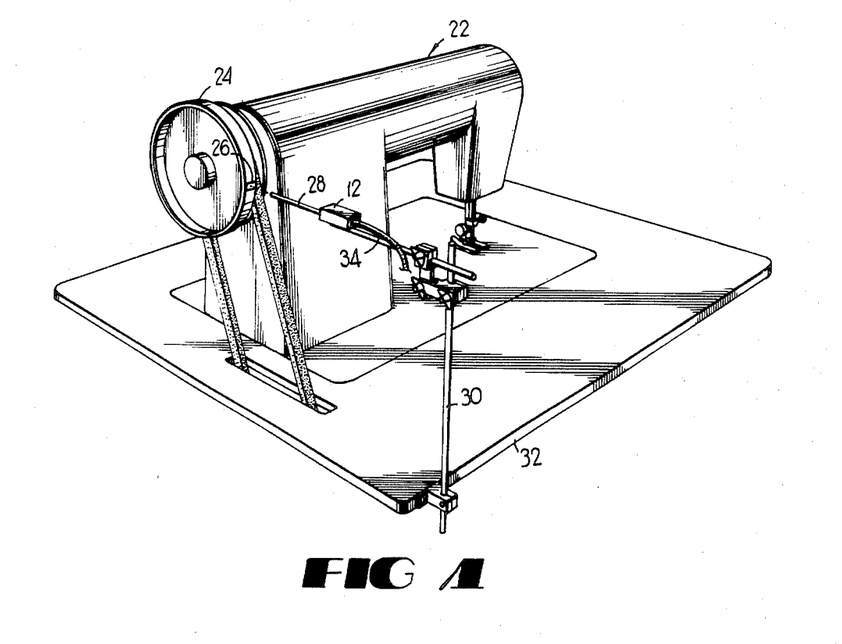
FIG. 1 is a perspective view showing a standard sewing machine with the infra-red sensor and reflective tape strip attached.

As shown in FIG. 1, the light sensor 12 can be mounted on any suitable support mechanism such as 30 which is attached to based 32 supporting the sewing machine 22. It should also be noted that the light sensor 12 with its probe 28 is not physically attached to the handwheel 24 so that the light sensor does not impair the operator's ability to grasp and move the handwheel as necessary during sewing operations. In fact, the light sensor can be displaced from the reflective tape as much as 0.40 inch to ensure there will be no interference with the operation of the handwheel.

The light sensor 12 is preferably an FE7B sub-miniature fiber optic photoelectric control manufactured by Micro Switch of Freeport, Ill. The probe 28 may be bent to a maximum bend radius of 0.40 inch in order to accommodate the end of the probe to the particular application. While FIG. 1 shows a standard sewing machine with the handwheel exposed above the base 32, other commercial sewing machines may have the handwheel mounted below the base with access only through a hole in the base. Consequently, the flexible probe 28 provides substantial advantages in monitoring the speed of the handwheel where access is limited. The Micro Switch light sensor 12 is available either with a visible red or invisible infra-red light source. The infra-red light source sensor is generally considered more stable when sensing a wide variety of colors. The light sensor operates on voltages of 10-28 volts DC and provides a current sink output of up to 100 milleamps. In the particular application of the present invention, an infra-red light is used, and the mode of operation is light operated, that is the output is energized when the reflecting tape is presented in line with the probe 28. In operation the light source is optically transmitted by means of fiber optic filaments to the end of the probe. When the light strikes the reflective tape, the reflected light is sensed by a photoelectric cell in the sensor which in turn generates the electrical signal on line 34.

The reflective tape used is a standard reflective tape used in highway markers and other similar applications.

The logic converter 14 receives the light operated output signal on line 34 from the light sensor 12. The logic converter 14 receives that negative going signal (from +5 volts to 0 volts) and converts it into a single ASCII character which is presented in real time on output line 36 to the digital computer 16.

Figure 3:
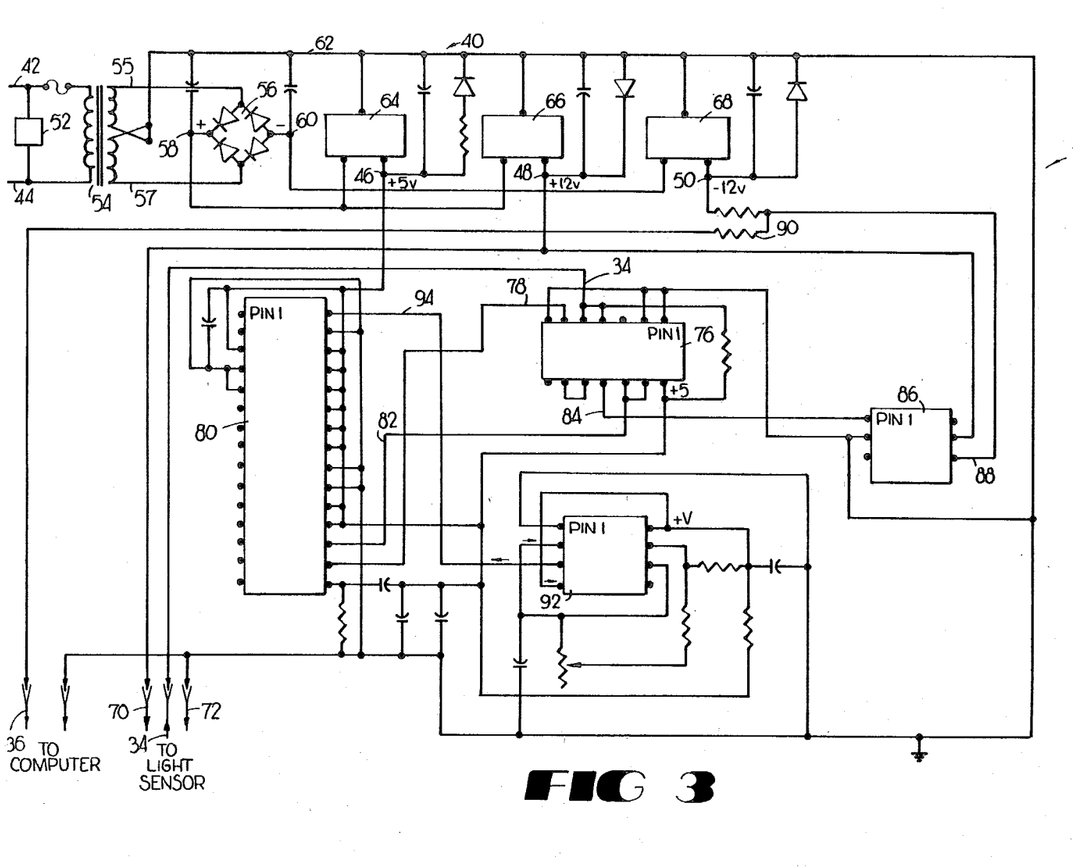
FIG. 3 is an electrical schematic for the logic converter used in connection with the present invention.
Figure 4A:
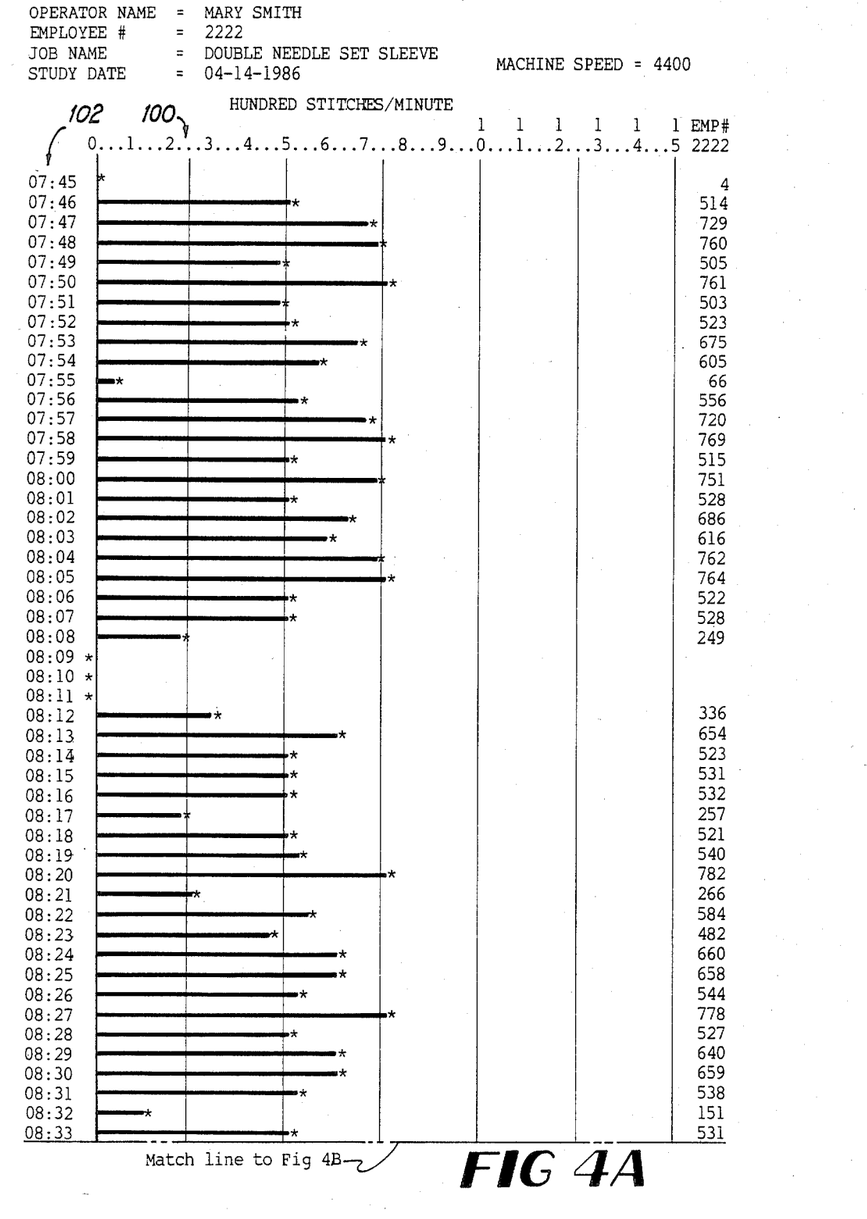
FIG. 4 (including parts 4A–4H) is a graph displaying a work versus time profile of a fictitious worker (Mary Smith) showing work efficiency for an entire work shift.
Figure 4B:
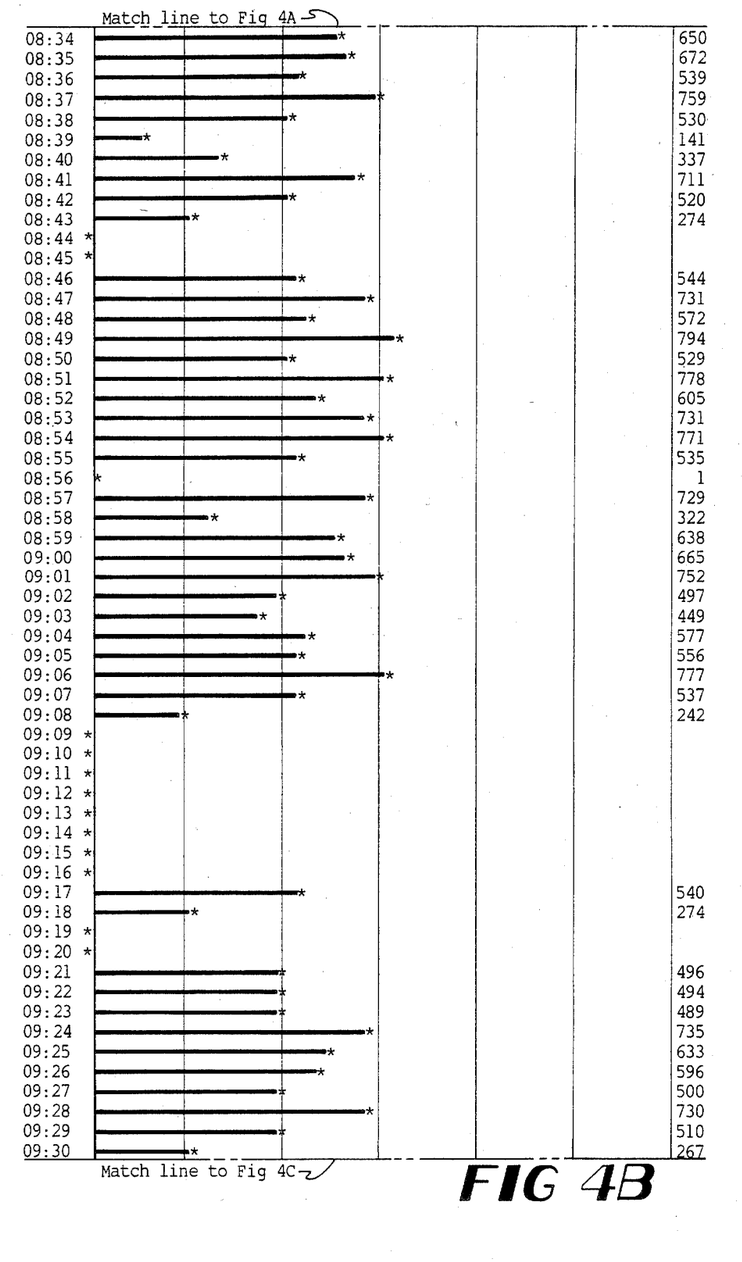
Figure 4C:
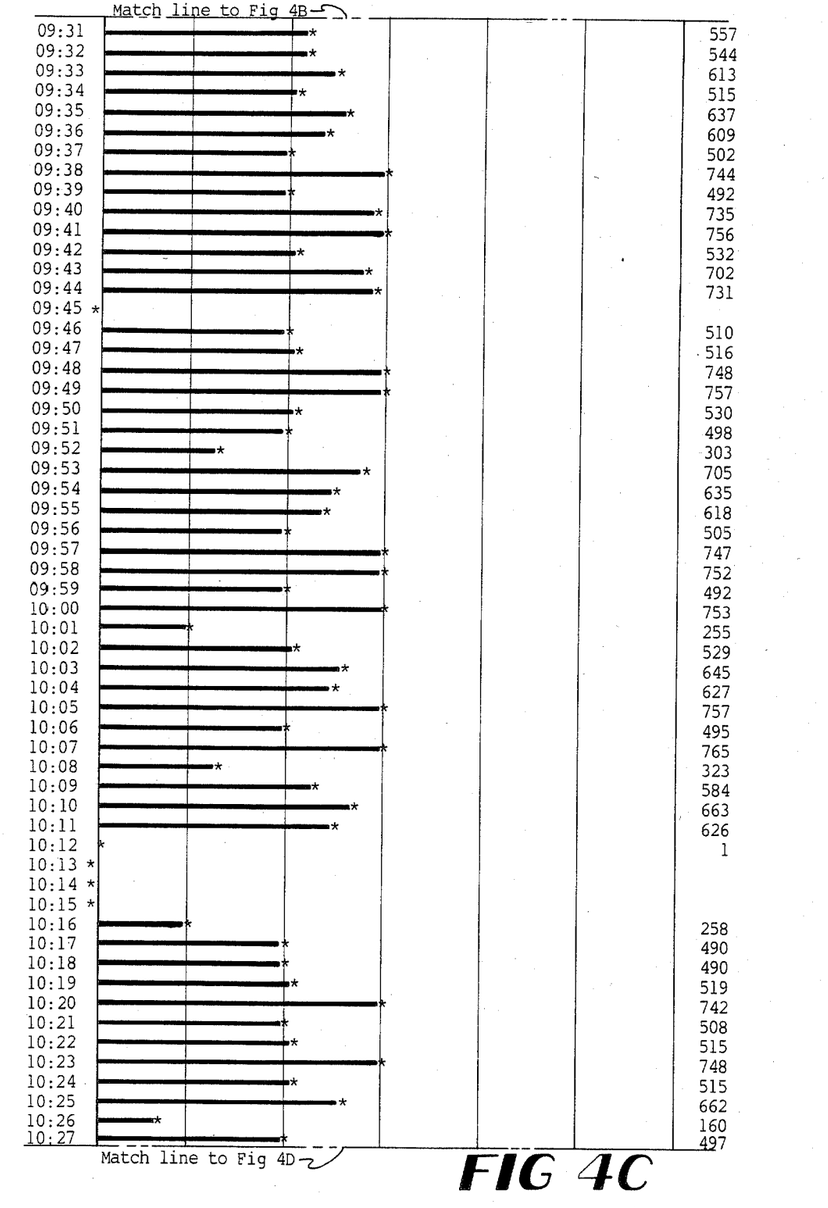
Figure 4D:
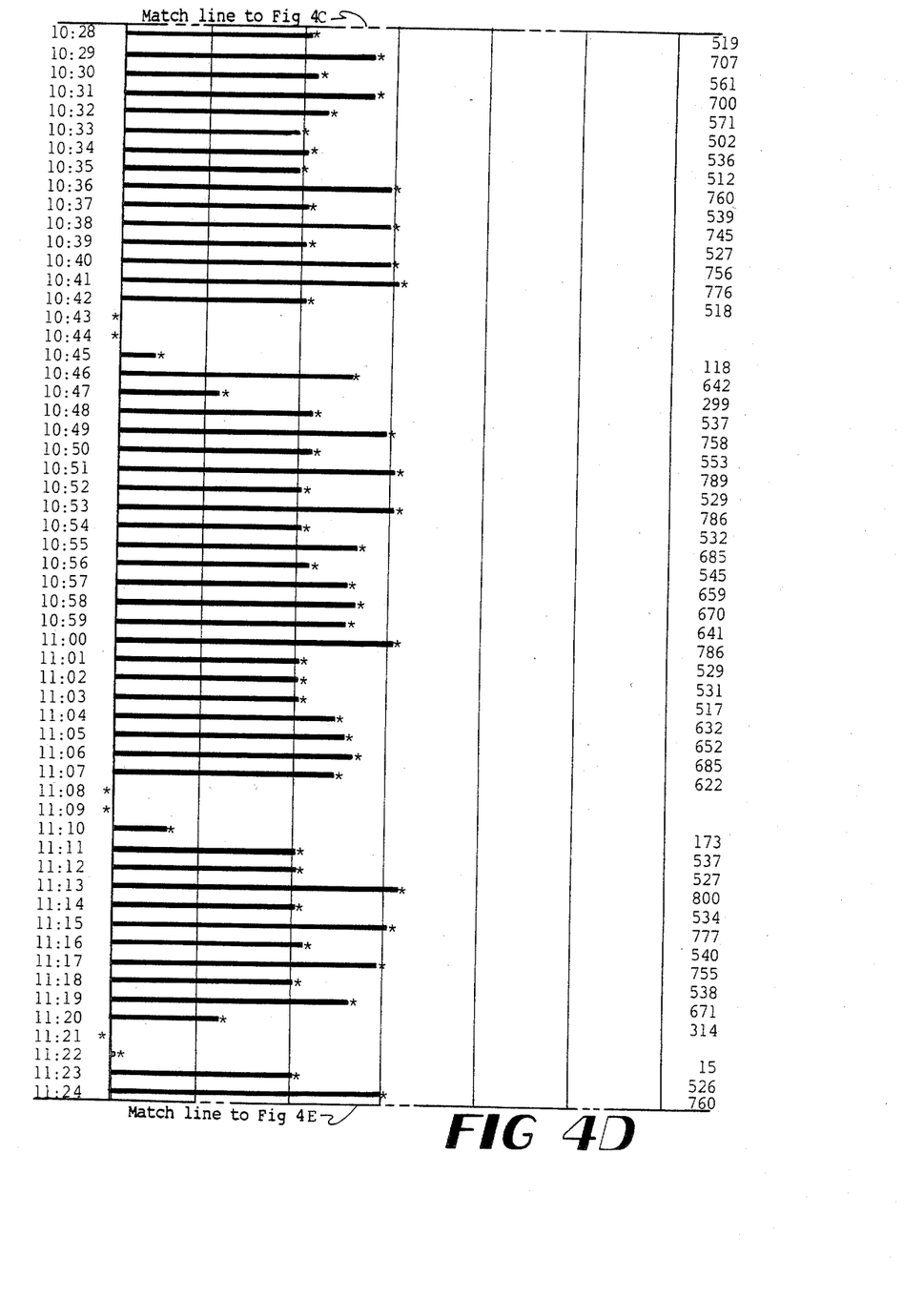
Figure 4E:
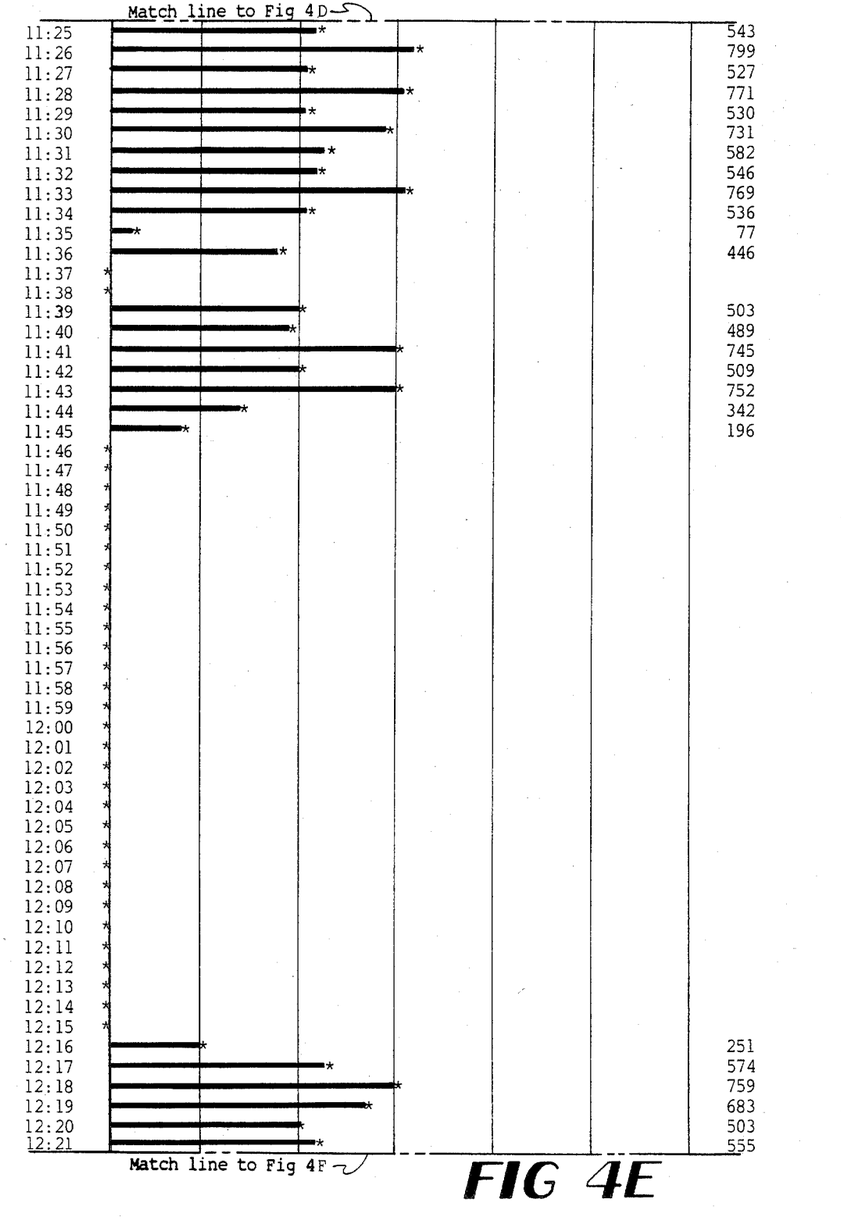
Figure 4F:
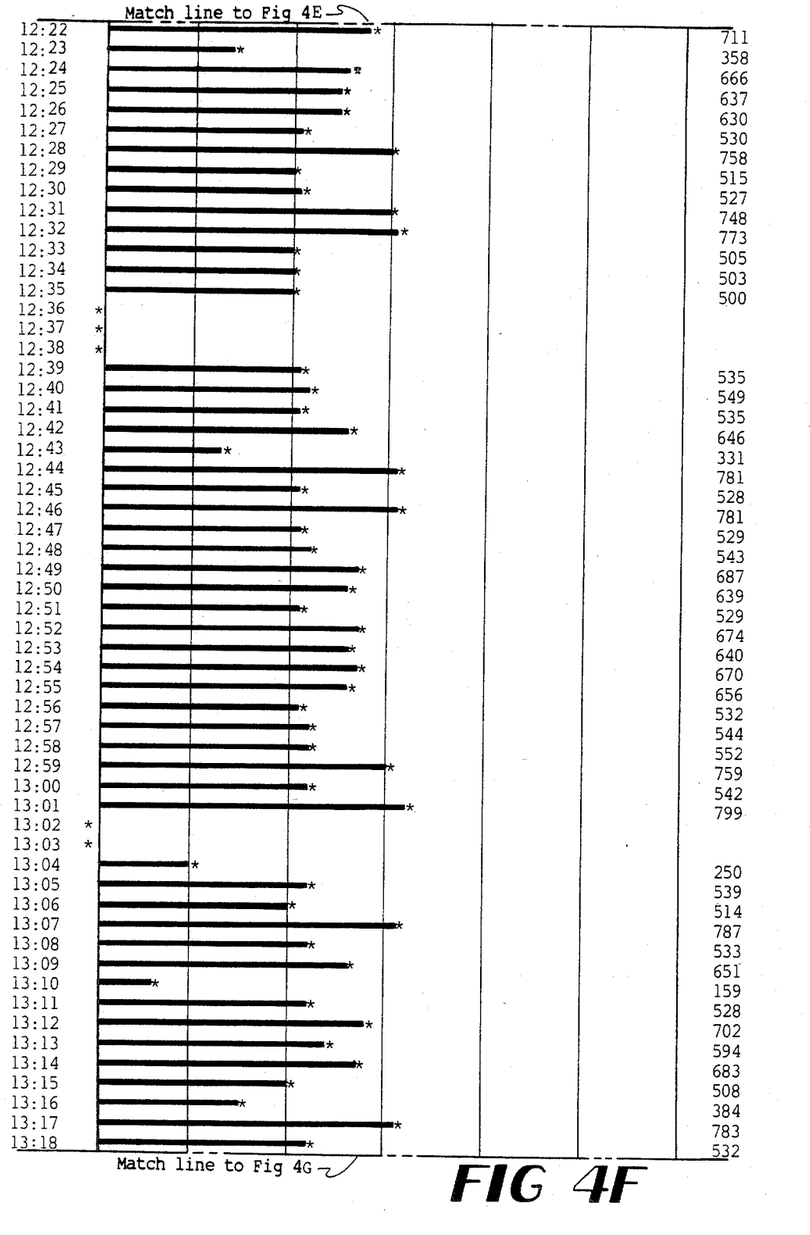
Figure 4G:
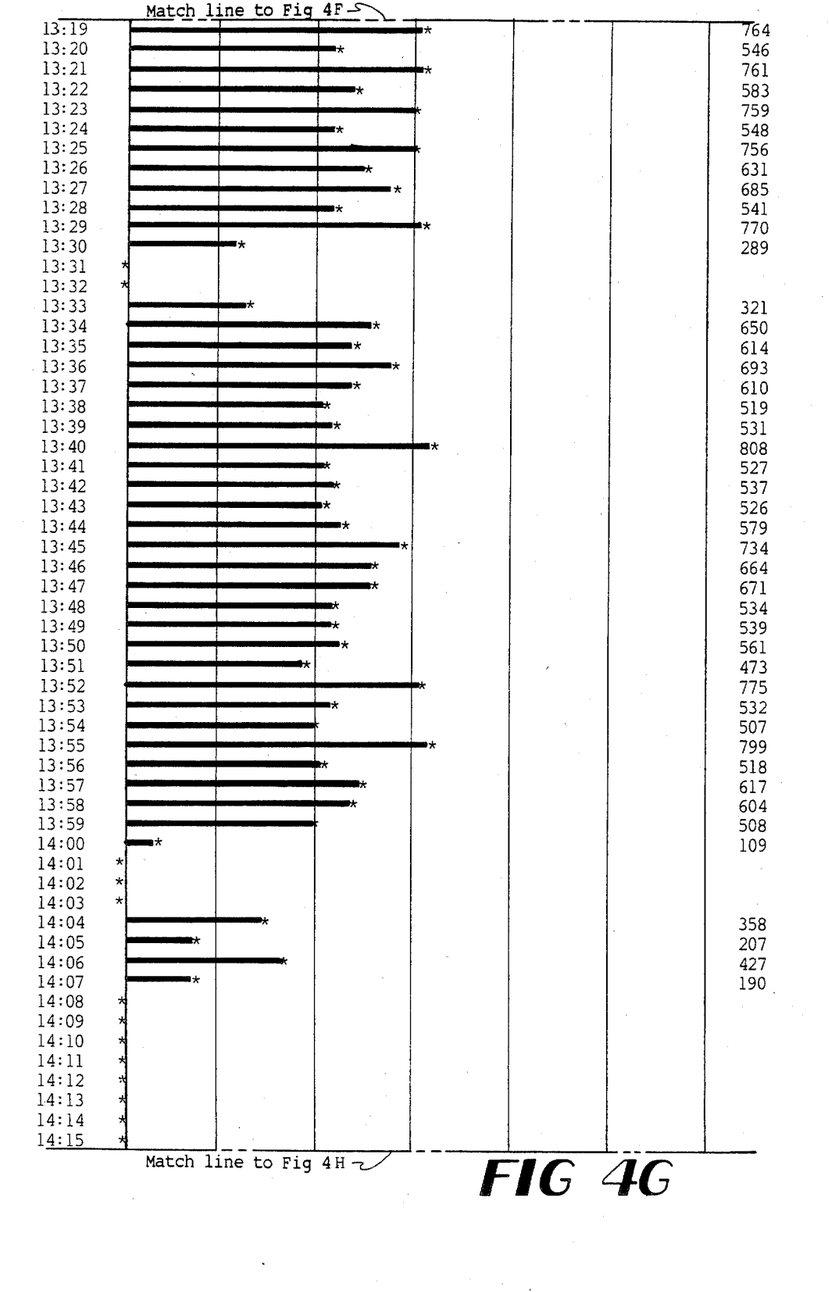
Figure 4H:
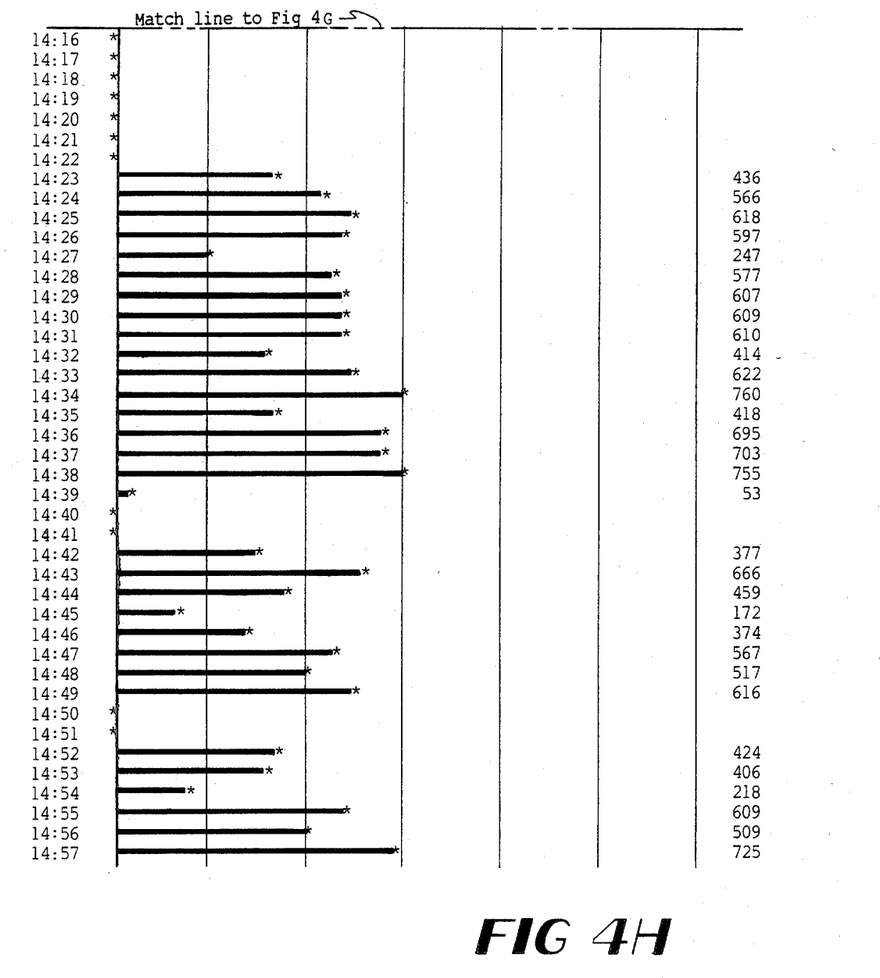

Turning to FIG. 3 there is shown an electric schematic of the logic converter 14. The logic converter 14 includes a power supply 40 of conventional design which converts standard a.c. current on lines 42 and 44 to a regulated +5 volts d.c. on line 46, +12 volts d.c. on line 48, and −12 volts d.c. on line 50. A metal oxide varistor 52 is connected across the a.c. line 42 and 44 to protect the power supply from voltage spikes. The a.c. current on lines 42 and 44 is stepped down to 24 volts a.c. by a center grounded transformer 54. The 24 volt a.c. current on lines 55 and 57 is then recitified to an unregulated d.c. voltage by means of full wave rectifier 56. The full wave rectifier 56 produces unregulated positive voltage on line 58 and an unregulated negative voltage on line 60 both with respect to ground on line 62. The unregulated positive d.c. voltage on line 58 is fed to regulators 64 and 66 which produce a regulated +5 d.c. voltage on line 46 and a regulated +12 d.c. voltage on line 48 respectively. The negative unregulated voltage on line 60 is fed to regulator 68 which produces a regulated −12 d.c. voltage on line 50. The regulators 64, 66, and 68 are conventional in design and are generally contained in a single solid state chip. The +12 d.c. voltage on line 48 along with the ground on line 62 are connected via lines 70 and 72 to the light sensor 12 to power the light sensor circuitry.

The logic converter 14 includes input pulse shaper circuit 76 which receives the negative going pulse (+5 volts to 0 volts) on line 34 from the light sensor 12. The pulse shaper 76 is an integrated circuit which contains four nand Schmidt triggers. One of the Schmidt triggers, having its output connected to line 78, is triggered by the negative going pulse on line 36 and produces a predictable duration positive going pulse on line 78 which is in turn connected to the clock input of ASCII character generator 80.

The character generator 80 is a conventional ASCII character generator which produces any one of 256 ASCII characters on output line 82. In connection with the present invention, it is not necessary that any particular ASCII character be generated as long as the computer 16 is programmed to simply recognize the absence or presence of any ASCII character. Therefore, the ASCII character generator 80 has most of its logic inputs connected together in order to ensure that the character generator is not falsely triggered by interference and consistently puts out an ASCII character for each incoming pulse from the light sensor.

The output signal from the ASCII character generator appears on line 82 which is connected to a second Schmidt trigger contained within pulse shaper 76. The output of the second Schmidt trigger on line 84 is connected through an optical isolator circuit 86 to isolate the input on line 84 from the output line 88. Output line 88 is in turn connected through resistor 90 to output line 36. The output on line 36 is thus a serially represented ASCII character which can be then transmitted to the computer for further analysis.

In addition, the logic converter 14 has a delay blocking circuit 92 which is a simple time delay circuit connected to an inhibit input 94 of the ASCII character generator 80 which serves to inhibit the output of an ASCII character. Depending on the time delay, the logic converter may be adjusted to produce an ASCII character for every pulse, every other pulse, every third pulse, every fourth pulse, etc. from the light sensor depending on the speed of the sewing machine and the time frame over which the sewing machine is being monitored. It is preferable, that the delay circuit 92 not be used and that an ASCII character be produced for every pulse received from the light sensor for the greatest degree of accuracy.

Once the ASCII character is produced on line 36, it is connected to a standard multi-purpose digital computer 16 which is preferably a personal computer, that is small and highly portable. Such a personal computer can easily be programmed by a person of ordinary skill in the art to count the number of ASCII characters generated over a particular short time frame to produce an instantaneous cycle speed for the sewing machine when the sewing machine is on which cycle speed can then be displayed as numbers of stitches per minute. The computer 16 also has a clock for establishing a continuous time coordinate so that, as the instantaneous speed varies over time, the speed of the machine can be displayed as a graph having the speed of the machine as the ordinate and the monitored time frame as the abscissa. The computer can be programmed to store the information received over time to be printed out at a later time for analysis or the printout can be generated in real time. In addition, the computer can be programmed to provide a printout in which the time scale along the abscissa is divided into increments of several minutes over the entire work shift of a day thereby showing the productivity of the worker over an entire shift. Alternatively, the time reference along the abscissa may be divided into shorter increments of several seconds in order to graphically show the operator's efficiency when carrying out specific operations over shorter periods of time.

FIG. 4 shows a typical printout 20 for a fictitious worker, Mary Smith, in which the time axis (abscissa) 102 is divided into increments of several minutes extending over the course of an entire work shift 7:45 to 14:57 (24-hour clock). The ordinate 100 is divided into hundreds of stitches per minute. It should be noted that for the particular machine being used by Mary Smith, the maximum speed is 4,400 stitches per minute. A quick scan of the chart shows that Mary Smith is not a particularly efficient operator in that her machine never tops 800 stitches/minute or about one-fifth the maximum machine speed. On the other hand, it can be readily appreciated that Mary Smith works fairly constantly during the course of the day taking time out from her work only during what appear to be apparent breaks for coffee around 9:00, for lunch around 11:45 and for an afternoon break around 14:00. Consequently, one would conclude that Mary Smith would be the kind of worker who, while apparently a diligent worker, would not be nearly realizing her full potential in terms of producing piece goods. The profile allows the supervisor to show Mary Smith why she is not producing piece goods as fast as other workers and thereby maximizing her income. Training of Mary Smith would then focus on trying to increase her machine speed so that her output would be maximized.

Figure 5A:
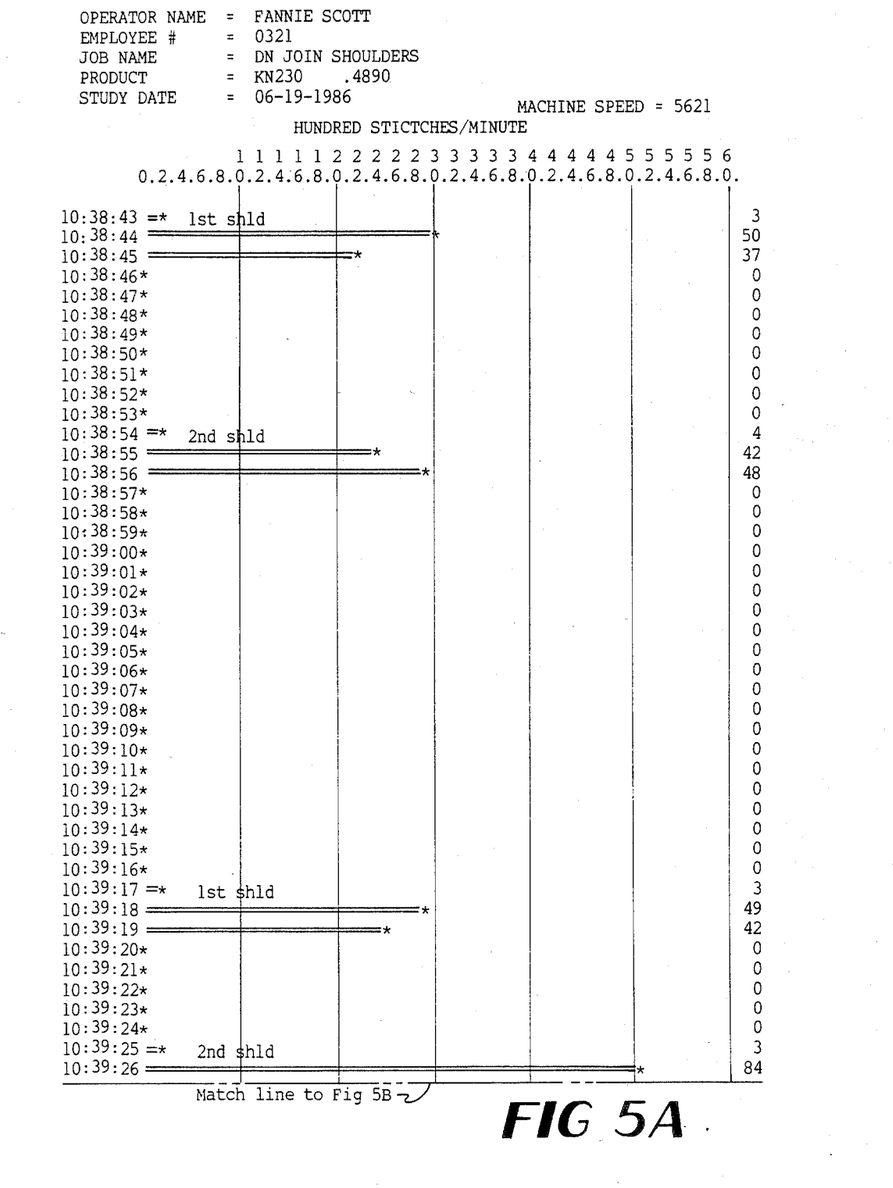
FIG. 5 (including parts 5A and 5B) is a graph displaying a work versus time profile of a fictitious worker (Fannie Scott) in which the time scale has been expanded to show the work efficiency for a particular task.
Figure 5B:
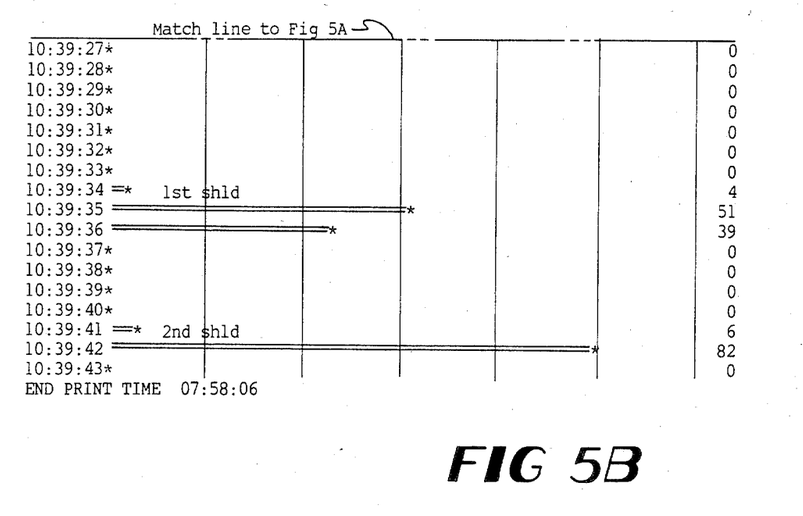

Turning to FIG. 5, there is shown a profile for another fictitious worker, Fannie Scott, while she is joining shoulders on a garment. The sewing machine has a maximum speed of 5621 stitches per minute. The ordinate 104 is divided into hundreds of stitches per minute, and the abscissa is divided into second increments for a minute.

The profile in FIG. 5 of Fannie Scott shows that she is remarkably better than Mary Smith in machine speed with all speeds between 2,000 and 5,000 stitches per minute. The expanded time scale on the abscissa, while not comparable to the profile of FIG. 4 (Mary Smith's) allows a supervisor to determine the nature of the sewing time lost during repositioning of the garment. Where there are large time losses for every operator, for example, revised handling procedures may be instituted to improve the efficiency of all workers. Alternatively where one worker shows excessive repositioning time losses, that worker may be transferred to a different sewing operation where she is more efficient.

I claim:

1. A device for monitoring the efficiency of operation of a sewing machine which is turned "on" and "off" by the operator, the sewing machine having an on period during which a rotatable member on the machine is rotated, and an off period during which the sewing machine is not operating and the rotatable member is not rotating, comprising:

a. a light source for shining on said rotatable member;

b. a reflector on a portion of said rotatable member for reflecting the light shined upon said rotatable member when said reflector is positioned in a prescribed position by rotation of said rotatable member;

c. a sensor mounted adjacent to said reflector for receiving the light reflected by said reflector, each time said rotatable member positions said light reflector in said prescribed position for thereby generating successive electrical signals;

d. logic circuitry means for converting said electrical signal into a digital output;

e. computing means for receiving said digital output, said computing means having a clock for establishing a continuous time coordinate signal and a processing means for calculating the speed of said rotatable member; and     f. plotting means for creating a profile of said speed as a function of said continuous time coordinate signal.

2. A device for monitoring the efficiency of operation of a machine which has a rotating member which rotates at speed proportional to the speed of the machine when said machine is operating and which no longer rotates when said machine is not operating, comprising:

a. signal generator connected to said rotating member for producing a signal proportional to the speed of rotation of said rotating member;

b. a logic circuit for converting said signal into a digital output;

c. computing means for receiving said digital output, said computing means having a clock for establishing a continuous time coordinate signal and processing means for calculating the instantaneous speed of said member; and d. plotting means for creating a profile of the speed of production of said member as a function of the continuous time coordinate signal.

3. The device defined in claim 2 wherein said sensor includes a light source positioned adjacent to said rotating member, a reflector forming a portion of said rotating member and a photoelectric cell disposed adjacent to said rotating member for receiving light reflected by said reflector from said light source.

4. The device of claim 2 including means for expanding or contracting the profile created on said plotting means.

* * * * *